(12) United States Patent
Ferguson et al.

(10) Patent No.: US 8,029,583 B2
(45) Date of Patent: Oct. 4, 2011

(54) CLEANING APPARATUS FOR A GAS FILTER

(75) Inventors: Brock E. Ferguson, Cottage Grove, OR (US); Rick D. Palahniuk, Pleasant Hill, OR (US)

(73) Assignee: Western Pneumatics, Inc., Eugene, OR (US)

( * ) Notice: Subject to any disclaimer, the term of this patent is extended or adjusted under 35 U.S.C. 154(b) by 555 days.

(21) Appl. No.: 12/060,003

(22) Filed: Mar. 31, 2008

(65) Prior Publication Data

US 2009/0151572 A1    Jun. 18, 2009

Related U.S. Application Data

(60) Provisional application No. 61/007,733, filed on Dec. 14, 2007.

(51) Int. Cl.
*B01D 46/04* (2006.01)
(52) U.S. Cl. ............................. 55/283; 55/294; 55/302
(58) Field of Classification Search .................. 96/427; 55/283, 294, 302; 95/280
See application file for complete search history.

(56) References Cited

U.S. PATENT DOCUMENTS

| | | | |
|---|---|---|---|
| 2,974,748 A | 3/1961 | Swanson | |
| 3,277,633 A | 10/1966 | Smoot | |
| 3,280,980 A | 10/1966 | King | |
| 3,482,378 A | 12/1969 | Noland | |
| 3,487,609 A | 1/1970 | Caplan | |
| 3,543,481 A | 12/1970 | Pausch | |
| 3,648,442 A | 3/1972 | Bourne | |
| 3,695,007 A | 10/1972 | Farnworth | |
| 3,793,811 A | 2/1974 | Bourne | |
| 3,832,832 A | 9/1974 | Hoon, Jr. | |
| 3,951,627 A | 4/1976 | Barr, Jr. et al. | |
| 4,022,595 A | 5/1977 | Noland | |
| 4,097,254 A | 6/1978 | Noland | |
| 4,157,899 A | 6/1979 | Wheaton | |
| 4,233,041 A | 11/1980 | Noland | |
| 4,293,320 A | 10/1981 | Robinson | |
| 4,306,890 A | 12/1981 | Gustavsson et al. | |
| 4,539,025 A | 9/1985 | Ciliberti et al. | |
| 4,544,389 A | 10/1985 | Howeth | |
| 4,655,799 A * | 4/1987 | Bosworth et al. | 96/427 |
| 4,854,951 A | 8/1989 | Stephenson | |
| 4,878,926 A | 11/1989 | Goodrich | |
| 5,116,395 A * | 5/1992 | Williams | 96/426 |
| 5,421,845 A * | 6/1995 | Gregg et al. | 55/294 |
| 2003/0221996 A1 * | 12/2003 | Svoronos et al. | 209/1 |

* cited by examiner

*Primary Examiner* — Duane Smith
*Assistant Examiner* — Tiffany N Palmer
(74) *Attorney, Agent, or Firm* — Kolisch Hartwell, P.C.

(57) ABSTRACT

A cleaning apparatus for a gas filter may include a movable support, a plurality of orifices, and a control system. The orifices may be arranged on the support for selective discharge of cleaning gas toward corresponding ones of filter openings disposed in a segment of a partition in the gas filter when the support is proximate that segment. The orifices may be grouped into at least first and second groups of orifices that may be fluidly connected to first and second valves configured for selective delivery of cleaning gas The control system may be configured to activate the first valve to cause a discharge of cleaning gas from the first group of orifices when the support is proximate a first segment and to activate the second valve to cause a discharge of cleaning gas from the second group of orifices when the support is proximate a second segment.

15 Claims, 4 Drawing Sheets

CLEANING APPARATUS FOR A GAS FILTER

RELATED APPLICATION

This application claims priority to U.S. Provisional Patent Application Ser. No. 61/007,733, which was filed on Dec. 14, 2007 and is entitled "Cleaning Apparatus for a Gas Filtering Apparatus." The complete disclosure of the above-identified patent application is hereby incorporated by reference for all purposes.

FIELD OF THE DISCLOSURE

The present disclosure relates to cleaning apparatus for gas filters, and more particularly to a reverse pulse jet cleaning apparatus for gas filters.

BACKGROUND OF THE DISCLOSURE

Examples of cleaning apparatus for gas filters, such as baghouse filters cleaned by way of a reverse pulse jet, are disclosed in U.S. Pat. Nos. 5,421,845; 5,116,395; 4,878,926; 4,854,951, 4,655,799; 4,544,389; 4,539,025; 4,306,890; 4,293,320; 4,233,041; 4,157,899; 4,097,254; 4,022,595; 3,951,627; 3,832,832; 3,793,811; 3,695,007; 3,648,442; 3,543,481; 3,487,609; 3,482,378; 3,280,980; 3,277,633; and 2,974,748. The disclosures of these and all other publications referenced herein are incorporated by reference in their entirety for all purposes.

SUMMARY OF THE DISCLOSURE

In some examples, a cleaning apparatus may be used with a gas filter that has clean and dirty gas chambers, which may be separated by a partition having a plurality of openings, each of which may be provided with a filter. The partition may be divided into a plurality of segments, and a first number of the openings may be arranged in a first pattern in each of the segments. The gas filter cleaning apparatus may include a source of cleaning gas, a support disposed within the clean gas chamber, a plurality of orifices disposed on the support, and a control system. The support may be configured for movement relative to the partition from a first cleaning position to a second cleaning position. The plurality of orifices may include a second number of orifices arranged in a second pattern approximately corresponding to the first pattern with the second number corresponding to the first number. The orifices may be configured for selective discharge of cleaning gas toward a corresponding one of the openings in a first one of the segments when the support is proximate the first cleaning position. The orifices may be configured for selective discharge of cleaning gas toward a corresponding one of the openings in a second one of the segments when the support is proximate the second cleaning position. The plurality of orifices may be grouped into at least first and second groups of orifices. Each one of the first group of orifices may be fluidly connected to a first valve and each one of the second group of orifices may be fluidly connected to a second valve. The first valve may be configured to selectively deliver cleaning gas from the source of cleaning gas to the first group of orifices for discharge. The second valve may be configured to selectively deliver cleaning gas from the source of cleaning gas to the second group of orifices for discharge without delivering cleaning gas to the first group of orifices. The control system may be configured to activate the first valve to cause a discharge of cleaning gas from the first group of orifices toward the partition when the support is proximate the first cleaning position, and control system may be configured to activate the second valve to cause a discharge of cleaning gas from the second group of orifices toward the partition when the support is proximate the second cleaning position.

In some examples, a cleaning apparatus may be used with an air filter that has clean and dirty air chambers, which may be separated by a partition having a plurality of openings, each of which may be provided with a filter bag extending into the dirty air chamber. The partition may be divided into a plurality of segments, and an equal number of the openings may be disposed in approximately the same arrangement in each segment. The cleaning apparatus may include a source of cleaning gas, a support disposed within the clean air chamber, a number of orifices disposed on the support, a drive mechanism, a sensor, and a control system. The orifices may be arranged in approximately the same arrangement as the arrangement of openings in each segment. The number of orifices may correspond to the number of the openings disposed in each segment. The orifices may be divided into at least first, second and third groups of orifices. Each of the first group of orifices may be fluidly connected to a first valve. Each of the second group of orifices may be fluidly connected to a second valve. Each of the third group of orifices may be fluidly connected to a third valve. Each one of the first, second and third valves may be configured to selectively deliver cleaning gas from the source of cleaning gas to the orifices that may be fluidly connected to that valve without delivering cleaning gas to the orifices fluidly connected to another one of the first, second and third valves. Each of the orifices may be configured to discharge cleaning gas toward the partition. The drive mechanism may be configured to move the support relative to the partition from a first cleaning position toward a second cleaning position and a third cleaning position. In the first cleaning position the support may position the orifices proximate the openings disposed in a first one of the segments. In the second cleaning position the support may position the orifices proximate the openings disposed in a second one of the segments. In the third cleaning position the support may position the orifices proximate the openings disposed in a third one of the segments. The sensor may be configured to provide a first indication when the support is proximate a first one of the first, second and third cleaning positions, a second indication when the support is proximate a second one of the first, second and third cleaning positions, and a third indication when the support is proximate a third one of the first, second and third cleaning positions. The control system may be configured such that, responsive to the first indication, the control system may activate the first valve to discharge cleaning gas from the first group of orifices. The control system may be configured such that, responsive to the second indication, the control system may activate the second valve to discharge cleaning gas from the second group of orifices. The control system may be configured such that, responsive to the third indication, the control system may activate the third valve to discharge cleaning gas from the third group of orifices.

In some examples, an air filter may include a housing, a filter plate, a cleaning arm, a drive mechanism, a sensor, a source of cleaning gas, nozzles disposed on the cleaning arm, and a control system. The housing may include a dirty air portion and a clean air portion proximate the dirty air portion. An inlet may be fluidly connected with the dirty air portion, and an outlet may be fluidly connected with the clean air portion. The filter plate may be disposed between and separate the dirty air portion from the clean air portion, and it may include a plurality of openings. The filter plate may be divided into a first number of segments. A second number of the openings may be disposed in a first pattern in each of the segments. A filter bag may be disposed in each of the openings. The cleaning arm may be disposed within the clean air portion, and it may be configured for rotation about an axis that is perpendicular to the filter plate. The drive mechanism may be configured to rotate the cleaning arm from a first cleaning position toward a second cleaning position. The sensor may be configured to provide a first indication when the cleaning arm is proximate the first cleaning position and a second indication when the cleaning arm is proximate the second cleaning position. A third number of the nozzles may be disposed on the cleaning arm. The nozzles may be arranged in a second pattern approximately corresponding to the first pattern, with the third number corresponding to the second number. Each of the nozzles may be configured for selective discharge of cleaning gas toward a corresponding one of the openings in a first one of the segments when the cleaning arm is proximate the first cleaning position. Each of the nozzles may be configured for selective discharge of cleaning gas toward a corresponding one of the openings in a second one of the segments when the cleaning arm is proximate the second cleaning position. The nozzles may be grouped into a fourth number of groups of nozzles with the first number of segments being greater than the fourth number of groups of nozzles. Each of the nozzles in a first one of the groups of nozzles may be fluidly connected to a first valve, and each of the nozzles in a second one of the groups of nozzles may be fluidly connected to a second valve. The first valve may be configured to selectively deliver cleaning gas from the source of cleaning gas to each of the nozzles in the first one of the groups of nozzles for discharge. The second valve may be configured to selectively deliver cleaning gas from the source of cleaning gas to each of the nozzles in the second group of nozzles for discharge, and it may do so without delivering cleaning gas to the nozzles in the first one of the groups of nozzles. At least some of the nozzles in the second one of the groups of nozzles may be disposed further from the axis than at least some of the nozzles in the first one of the groups of nozzles. The control system may be configured to activate the first valve to cause a discharge of cleaning gas from the nozzles of the first one of the groups of nozzles toward the filter plate in response to the first indication. The control system may also be configured to activate the second valve to cause a discharge of cleaning gas from the nozzles of the second one of the groups of nozzles toward the filter plate in response to the second indication.

DETAILED DESCRIPTION OF THE DISCLOSURE

Figure 1:
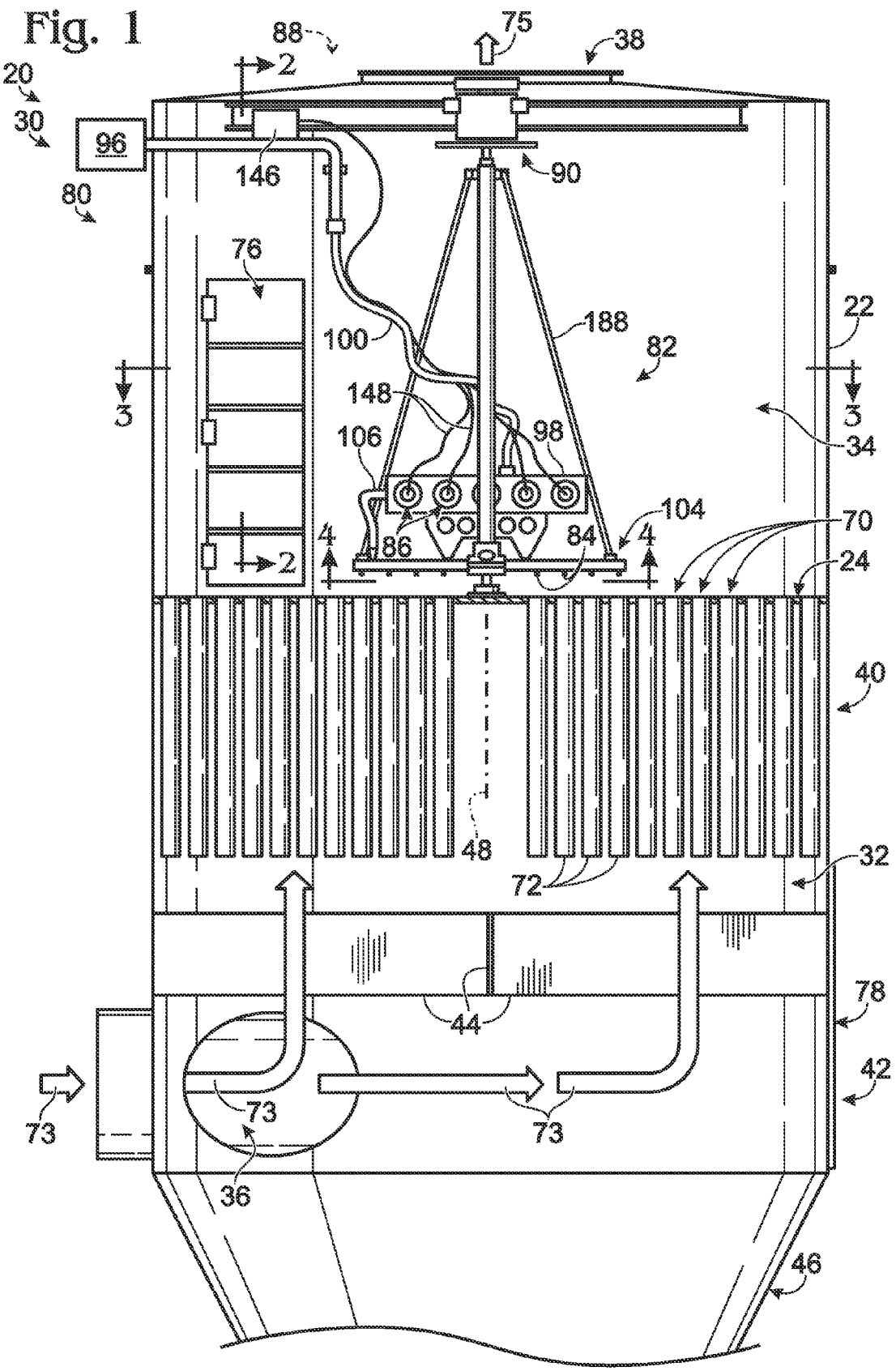
FIG. 1 is a partially sectioned elevation view of an illustrative example of a gas filter including an illustrative example of a cleaning apparatus.

A nonexclusive illustrative example of an air or gas filter is shown generally at 20 in FIG. 1. Unless otherwise specified, gas filter 20 may, but is not required to, contain at least one of the structure, components, functionality, and/or variations described, illustrated, and/or incorporated herein. The gas filter 20 may include a housing 22, a filter plate 24, and a cleaning apparatus 30.

The housing 22 may include a dirty air portion or chamber 32 and a clean air portion or chamber 34, which may be proximate the dirty air chamber 32. As shown in FIG. 1, the filter plate 24 may be disposed between the dirty air chamber 32 and the clean air chamber 34 such that the filter plate 24 separates the dirty air chamber 32 from the clean air chamber 34. An inlet 36 may be fluidly connected with the dirty air chamber 32, and an outlet 38 may be fluidly connected with the clean air chamber 34. The dirty air chamber 32 may include a filter region or portion 40, a cylindrical inlet region or portion 42, and at least one vortex breaker 44, which may be disposed between the filter portion 40 and the cylindrical inlet portion 42. The dirty air chamber 32 may additionally include a hopper or discharge section 46 into which contaminant particles that have been removed and/or filtered from the dirty air stream may be discharged or deposited for later removal. In some examples, the hopper or discharge section 46 may be at least partially frustoconical in shape.

Figure 3:
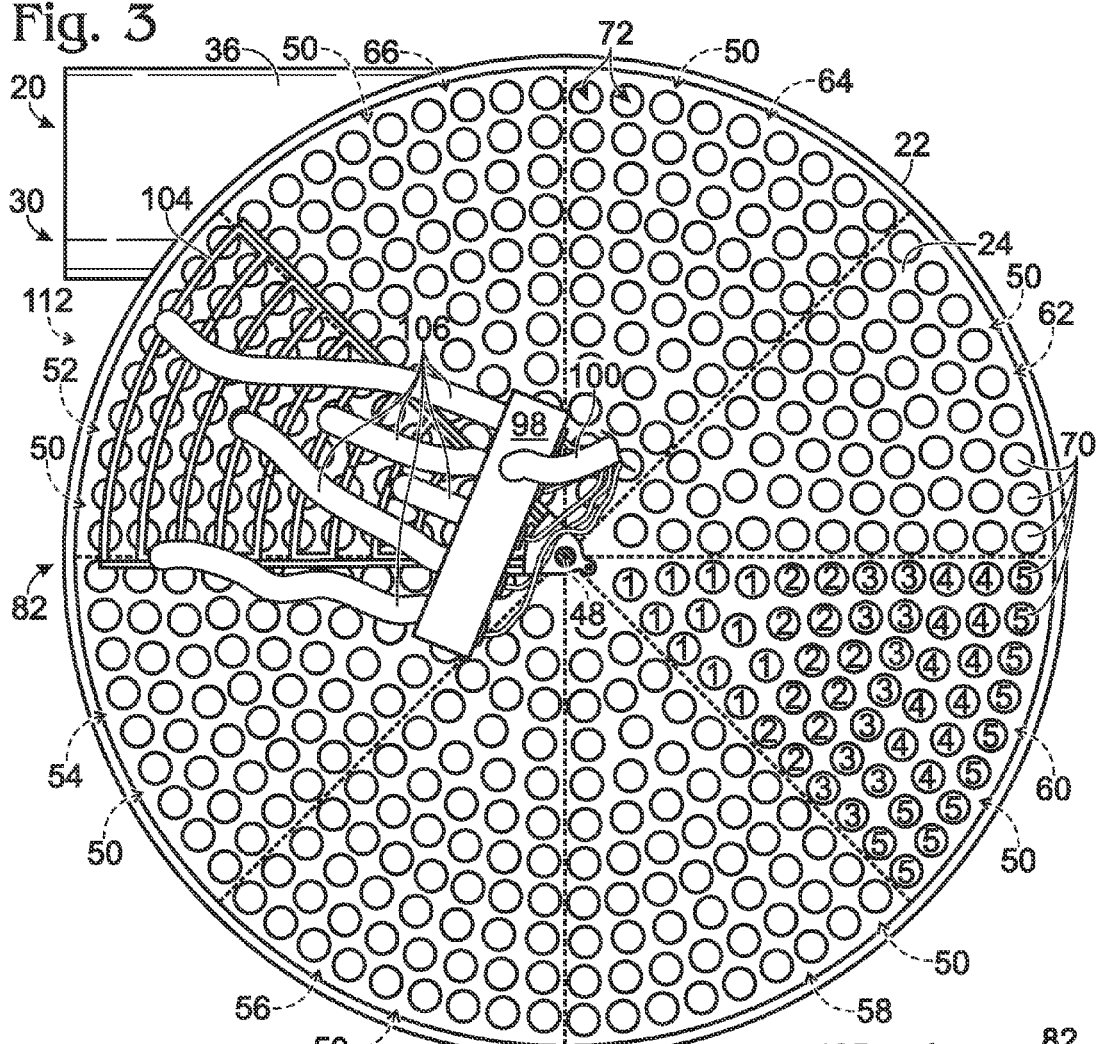
FIG. 3 is a section view of the gas filter and cleaning apparatus of FIG. 1, taken generally along line 3-3 in FIG. 1, showing the plenum side of the cleaning apparatus, and with the support rods omitted.

The filter plate 24 may be divided into a plurality of regions or segments 50, which are indicated by the dashed lines in FIG. 3. Each segment 50 may correspond approximately to a circular sector when the filter plate 24 is circular in shape, as shown in the example presented in FIG. 3. When the filter plate is other than circular in shape, the segments 50 may be other shapes such as triangles, squares, rectangles, trapezoids, parallelograms, or the like.

The filter plate 24 may be divided into a suitable number of segments 50, such as where the filter plate 24 includes a first segment 52, a second segment 54, a third segment 56, a fourth segment 58, a fifth segment 60, a sixth segment 62, a seventh segment 64 and an eighth segment 66, as shown in FIG. 3. Other suitable numbers of segments into which the filter plate may be divided include two, three, four, five, six, seven or even nine or more segments.

The filter plate 24 may include a plurality of openings 70. A suitable fraction or number of the openings 70 may be disposed or located in each of the segments 50. A suitable number of openings for each segment may be at least as many openings as there are groups of orifices, as will be more fully discussed below. In some examples, the number of openings 70 in each segment may be evenly divisible by the number of groups of orifices. For example, as shown in FIG. 3, there may be fifty-five (55) openings 70 in each segment 50. However, a suitable number of openings for a particular segment may be a function of the relative sizes and shapes of the openings 70 and the segments 50. For example, as shown in FIG. 3, the fifty-five (55) openings 70 in each segment 50 may be the maximum number of circular openings of a given size that may fit within a circular sector-shaped segment of a given size. Although circular openings 70 are shown in FIG. 3, other suitable opening shapes may include elliptical, oval, square, rectangular, or even a combined shape, such as one having rounded ends and straight sides. In some examples, there may be an equal number of the openings 70 in each of the segments 50.

The openings 70 may be arranged in a suitable pattern or arrangement in each of the segments 50. A suitable pattern or arrangement may be one in which a maximum number of a particularly shaped opening may be packed within a particularly shaped segment. Other suitable patterns or arrangements of openings within a particular segment may be based on providing a uniform spacing between openings or a uniform spatial distribution of openings. In the case of a circular filter plate 24 having circular sector-shaped segments 50, the openings 70 may be arranged in concentric circular arcs, such as with a maximum number of openings disposed along each of the arcs in a particular segment. As shown in FIG. 3, the openings may be disposed in approximately the same pattern or arrangement in each of the segments. Further, as shown in FIG. 3, each of the openings 70 may be disposed wholly within a particular one of the segments 50.

A filter element or filter 72 may be disposed in each of the openings 70. As shown in FIG. 1, the filters 72 may be in the form of generally cylindrical filter bags, which may extend from the filter plate 24 and into the filter portion 40 of the dirty air chamber 32. A gas filter such as the gas filter 20 of FIG. 1 may be known as a baghouse filter.

The process air or gas flow through the gas filter 20 is illustrated by the arrows 73 and 75 in FIG. 1. In particular, the general process gas flow through the gas filter 20 may be for unfiltered or dirty gas to flow into the dirty air chamber 32 via the inlet 36, as generally indicated by the arrows 73, with filtered or cleaned gas flowing out from the clean air chamber 34 via the outlet 38, as generally indicated by the arrows 75. The filter bags may be provided with a suitable support, such as a support cage disposed within the bags, because the flow of air or gas indicated in FIG. 1 passes from the outside of the filter bags to the inside of the filter bags.

As shown in FIGS. 1 and 3, the inlet 36 may be tangentially mounted to the housing 22, such as to induce a cyclonic flow of dirty gas within the cylindrical inlet portion 42. Such a cyclonic flow of dirty air may remove larger contaminant particles from the dirty air due to the centrifugal forces induced by the cyclonic motion of the air flow. The vortex breaker 44 may transform the cyclonic flow of dirty air into a flow that is aligned with the axis 48 of the housing 22, such as prior to passing or flowing into the filter portion 40 and the filters 72.

The housing 22 may include additional features as known in the art. For example, the clean air chamber 34 may include an access door 76, which may provide maintenance access to the cleaning apparatus 30 and/or access for replacement of the filters 72. The dirty air chamber 32 may include one or more explosion vents of blow-out panels 78.

The cleaning apparatus 30 may include a source of cleaning gas 80, a support or cleaning arm 82, a plurality of orifices 84, a plurality of valves 86, a control system 88, and, in some examples, a drive mechanism 90 and a sensor 92. Unless otherwise specified, examples of the cleaning apparatus 30 may, but are not required to, contain at least one of the structure, components, functionality, and/or variations described illustrated, and/or incorporated herein. As will be more fully discussed below, the cleaning apparatus 30 may provide a reverse-jet type cleaning action in which a short burst of cleaning gas is directed into the filters in opposition to the flow of process gas through the gas filter. The short burst of cleaning gas may be of sufficient pressure and duration such that it may briefly flex the filters 72, such as when the filters are filter bags, which may dislodge any cake of contaminant or dust particles that has accumulated on the filter. The dislodged cake of contaminant or dust particles may then fall into the discharge section 46 for removal.

The source of cleaning gas 80 may include a blower 96 and a manifold or plenum 98. As shown in FIG. 1, the blower 96 may be at least partially external to the gas filtering apparatus 22, such as where the blower 96 is at least partially external to the housing 22. The plenum 98 may be disposed on the cleaning arm 82 and may be fluidly connected to the blower via a flexible supply tube or hose 100. The blower 96 may be configured to charge the plenum 98 with cleaning gas for delivery to the orifices 84, as will be more fully discussed below. In some examples, the blower 96 may be configured to charge the plenum 98 with cleaning gas at about twenty-five to thirty (25-30) psi. The various components of the source of cleaning gas 80 may be sized and/or configured to deliver to the orifices 84 a particular volume of cleaning gas at a particular pressure and for a particular period of time.

In some examples, the source of cleaning gas 80 may additionally or alternatively be configured to provide higher pressure cleaning gas. For example, the source of cleaning gas 80 may include a source of compressed air such as a positive displacement or other type of compressor, such as one configured to charge the plenum 98 with cleaning gas at about eighty to one hundred (80-100) psi.

The cleaning arm 82 may be disposed within the clean air chamber 34, as shown in FIG. 1, and configured for movement relative to the filter plate 24. For example, as will be discussed more fully below, the cleaning arm 82 may be configured for motion relative to the filter plate 24 amongst or between a plurality of cleaning positions. In each cleaning position, the cleaning arm 82 may be proximate or above a particular one of the segments 52-66 of the filter plate 24, such as the first segment 52, as shown in FIG. 3. As used herein, the relative direction or orientation corresponding to "above" is based on the example presented in FIG. 1. In particular, as used herein, the term "above" should not be understood to require any particular orientation of the air filter 20 or cleaning arm 82 in space. In some examples, the cleaning arm 82 may be configured for motion from a cleaning position proximate or above a particular one of the segments 52-66 toward a cleaning position proximate or above an adjacent one of the segments 52-66. In some examples, the cleaning arm may be configured for motion from a cleaning position proximate or above a first one of the segments 52-66 toward a second cleaning position proximate or above another one of the segments 52-66 that is not adjacent to the first one of the segments 52-66.

As shown in the example presented in FIGS. 1-5, the cleaning arm 82 may be configured for rotation about the axis 48, which may be perpendicular to the filter plate 24. In some examples, the cleaning arm 82 may be configured for non-rotational movement relative to the filter plate 24. For example, the cleaning arm 82 may be moved or translated in a linear manner and/or in an x-y or bidirectional manner.

The cleaning arm 82 may include a blow-tube assembly 104, and the plurality of orifices 84 may be disposed on the blow-tube assembly 104. The cleaning gas may be supplied to the plurality of orifices 84 via at least one hose or distribution pipe 106, which may be fluidly connected to the plenum 98 and the blow tube assembly 104.

Figure 2:
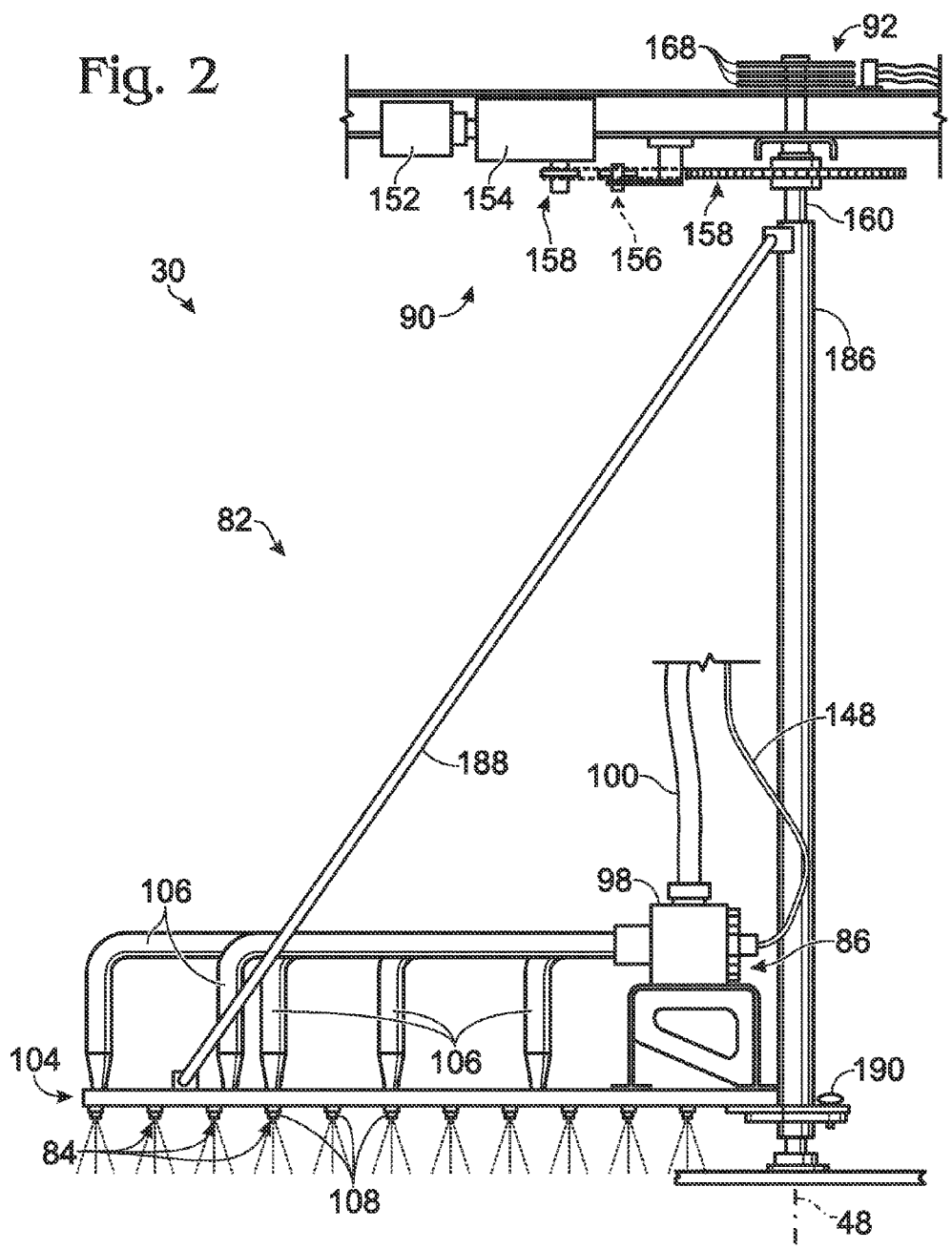
FIG. 2 is a side elevation view of the cleaning apparatus shown in FIG. 1.

Each of the plurality of orifices 84 disposed on the cleaning arm 82 may be configured to discharge cleaning gas toward the filter plate 24, as suggested in FIG. 2. In some examples, a plurality of nozzles 108 may be disposed on the blow-tube assembly 104 of the cleaning arm 82, with each of the nozzles 108 having at least one orifice 84 configured to discharge cleaning gas toward the filter plate 24.

Figure 4:
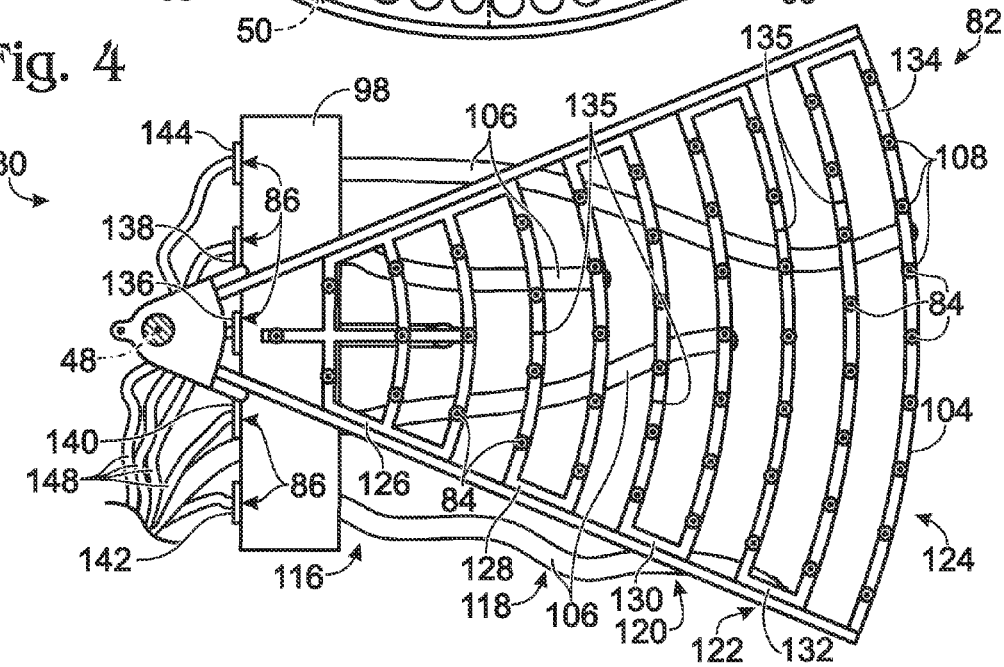
FIG. 4 is another section view of the gas filter and cleaning apparatus of FIG. 1, taken generally along line 4-4 in FIG. 1, and showing the discharge side of the cleaning apparatus.

The number of the orifices 84, and nozzles 108 if present, disposed on the cleaning arm 82 may correspond to the number of the openings 70 in each segment 50 of the filter plate 24. For example, as shown in FIGS. 3 and 4, there may be equal numbers of orifices and openings. Thus, as shown in FIGS. 3 and 4, fifty-five (55) orifices 84 may be disposed on the blow-tube assembly 104 of the cleaning arm 82. Likewise, there may be fifty-five (55) openings 70 in each segment 50 of the filter plate 24. However, in some examples, there may be a plurality of orifices 84 associated with each opening 70 in each segment 50 of the filter plate 24. In some examples, there may be a plurality of openings 70 in each segment 50 of the filter plate 24 associated with each orifice 84.

The plurality orifices 84, and nozzles 108 if present, may be disposed on the cleaning arm 82 in approximately the same arrangement or pattern as the pattern in which the openings 70 are arranged in each segment 50 of the filter plate 24. Thus, as will be more fully discussed below, the orifices 84 may be disposed on the cleaning arm 82 such that the cleaning arm 82 may concurrently position, locate and/or orient each of the plurality of orifices 84 proximate to and/or aligned with a corresponding one of the openings 70 in a particular segment 50 of the filter plate 24. By "aligned," it is meant that a particular orifice 84, and nozzle 108 if present, is located and/or oriented such that cleaning gas discharged from the orifice 84 may be directed toward the opening 70 with which the particular orifice 84 is aligned.

The cleaning arm 82 may be in or proximate a cleaning position associated with a particular segment 50 of the filter plate 24 when each of the orifices 84, and nozzles 108 if present, is configured and/or aligned for selective discharge of cleaning gas toward a corresponding one of the openings 70 in that segment. As the orifices 84 and/or nozzles 108 may be physically smaller than the openings, each cleaning position may actually be a small range of discrete positions in which each of the orifices 84, and nozzles 108 if present, is configured and/or aligned for selective discharge of cleaning gas toward a corresponding one of the openings 70 in that segment.

For example, the cleaning arm 82 may be proximate or in a first cleaning position 112 as shown in FIG. 3, when the cleaning arm 82 concurrently positions, locates and/or orients each of the plurality of orifices 84 proximate a corresponding one of the openings 70 in the first segment 52 of the filter plate 24. Thus, when the cleaning arm is proximate the first cleaning position 112, each of the orifices 84 may be configured for selective discharge of cleaning gas toward a corresponding one of the openings 70 in the first segment 52. Similarly, for the air filter 20 shown in FIG. 3, the cleaning arm 82 may be proximate or in a second, third, fourth, fifth, sixth, seventh or eighth cleaning position, when the cleaning arm 82 concurrently positions, locates and/or orients each of the plurality of orifices 84 proximate a corresponding one of the openings 70 in a respective one of the second segment 54, the third segment 56, the fourth segment 58, the fifth segment 60, the sixth segment 62, the seventh segment 64 or the eighth segment 66 of the filter plate 24. Thus, when the cleaning arm 82 is proximate the second, third, fourth, fifth, sixth, seventh or eighth cleaning position, each of the orifices 84 may be configured for selective discharge of cleaning gas toward a corresponding one of the openings 70 in a respective one of the second, third, fourth, fifth, sixth, seventh or eighth segments of the filter plate 24.

The orifices 84, and nozzles 108 if present, may be grouped into a suitable number of groups of orifices 84 and/or nozzles 108. As each group of orifices 84 and/or nozzles 108 may be associated with a particular group of openings 70 within each segment 50 of the filter plate 24, the groups of orifices 84 and/or nozzles 108 may be interchangeably discussed with the groups of openings 70 within each segment 50 of the filter plate 24. Thus, as shown in the fifth segment 60 of the filter plate 24 illustrated in FIG. 3, the openings 70 have been marked with a numeral corresponding to a particular one of the groups of orifices 84. In particular, the openings 70 having a (1) therein correspond to orifices 84 in a first group of orifices 116. The openings 70 having a (2) therein correspond to orifices 84 in a second group of orifices 118. The openings 70 having a (3) therein correspond to orifices 84 in a third group of orifices 120. The openings 70 having a (4) therein correspond to orifices 84 in a fourth group of orifices 122. The openings 70 having a (5) therein correspond to orifices 84 in a fifth group of orifices 124.

Thus, as shown in the example presented in FIGS. 3 and 4, the plurality orifices 84 and nozzles 108 may be grouped into five groups. Other Suitable numbers of groups of orifices 84 and/or nozzles 108 may include two, three, four, or even six or more groups. The number of groups orifices 84 and/or nozzles 108 may be functionally related to the total number of orifices 84 and/or nozzles 108. For example, the number of orifices 84 and/or nozzles 108 in a particular group may be set at or below a particular number. Determination of a suitable number of orifices 84 and/or nozzles 108 per group may be based on the ability of the source of cleaning gas 80 to supply a predetermined volume of cleaning gas to each orifice 84 in a group at a particular pressure and/or within a particular time such that a desired cleaning effect may be achieved. As shown in FIG. 4, eleven orifices and/or nozzles per group may be a suitable number. Other nonexclusive illustrative examples of a suitable number of orifices 84 and/or nozzles 108 per group may be two, three, four, five, six, seven, eight, nine, ten, or even twelve or more orifices and/or nozzles per group.

In some examples, each of the groups of orifices 84 and/or nozzles 108 may be exclusive of one another. Thus, the blow tube assembly 104 may be divided into a plurality of sections, with the number of sections corresponding to the number of groups of orifices 84 and/or nozzles 108. For example, as shown in FIG. 4, a first section 126 of the blow tube assembly 104 may include the orifices 84 in the first group of orifices 116. A second section 128 of the blow tube assembly 104 may include the orifices 84 in the second group of orifices 118. A third section 130 of the blow tube assembly 104 may include the orifices 84 in the third group of orifices 120. A fourth section 132 of the blow tube assembly 104 may include the orifices 84 in the fourth group of orifices 122. A fifth section 134 of the blow tube assembly 104 may include the orifices 84 in the fifth group of orifices 124.

The sections of the blow tube assembly 104 may be fluidly divided from one another as suggested by the divisions 135 in FIG. 4. The divisions 135 may allow delivery of cleaning gas to one section of the blow tube assembly 104 without delivering cleaning gas to other sections of the blow tube assembly 104. As is shown in FIGS. 3 and 4, a particular one of the distribution pipes 106 may be associated with each section of the blow tube assembly 104. Thus, a particular one of the valves 86 may be associated with each section of the blow tube assembly 104 and correspondingly with a particular one of the groups of orifices 84 and/or nozzles 108, as will be more fully discussed below.

In some examples, the number of segments 50 of the filter plate 24 may be greater than the number of groups of orifices 84 and/or nozzles 108. For example, as shown in FIGS. 3 and 4 and discussed above, there may be eight segments 40 of the filter plate 24 and five groups of orifices 84 and/or nozzles 108.

Where the cleaning arm 82 is configured for rotation about the axis 48, at least some of the groups of orifices 84 and/or nozzles 108 may be disposed at different radial distances from the axis 48. For example, as shown in FIGS. 3 and 4, at least some of the orifices 84 in the second group of orifices 118 may be disposed further from the axis 48 than at least some of the orifices 84 in the first group of orifices 116. In some examples, at least some of the orifices 84 in the third group of orifices 120 may be disposed further from the axis 48 than at least some of the orifices 84 in the second group of orifices 118.

Each of the orifices 84, and nozzles 108 if present, may be fluidly connected to at least one of the plurality of valves 86. For example, a first valve 136 may be fluidly connected via one of the distribution pipes 106 to the first section 126 of the blow tube assembly 104 and thus be fluidly connected to the first group of orifices 116. A second valve 138 may be fluidly connected via one of the distribution pipes 106 to the second section 128 of the blow tube assembly 104 and thus be fluidly connected to the second group of orifices 118. A third valve 140 may be fluidly connected via one of the distribution pipes 106 to the third section 130 of the blow tube assembly 104 and thus be fluidly connected to the third group of orifices 120. A fourth valve 142 may be fluidly connected via one of the distribution pipes 106 to the fourth section 132 of the blow tube assembly 104 and thus be fluidly connected to the fourth group of orifices 122. A fifth valve 144 may be fluidly connected via one of the distribution pipes 106 to the fifth section 134 of the blow tube assembly 104 and thus be fluidly connected to the fifth group of orifices 124.

The number of orifices 84 and/or nozzles 108 in each group may correspond to the capability of the valves 86 and/or the ability of the source of cleaning gas 80 to deliver cleaning gas to that number of orifices 84 and/or nozzles 108. For example, the number of orifices 84 and/or nozzles 108 in each group may be set at or below a suitable number. A suitable number of orifices 84 and/or nozzles 108 in each group may be based on the capabilities of the valve and/or the ability of the source of cleaning gas 80 to deliver a particular volume of cleaning gas at a particular pressure for a particular time. As shown in FIGS. 3 and 4, eleven orifices 84 and/or nozzles 108 per valve 86 may be a suitable number. Other nonexclusive illustrative examples of a suitable number of orifices 84 and/or nozzles 108 per valve 86 may be two, three, four, five, six, seven, eight, nine, ten, or even twelve or more orifices 84 and/or nozzles 108 per valve 86.

The combination of multiple groups of orifices 84 and several segments 50 or cleaning positions may permit a relatively low number of valves to deliver acceptable pulses of cleaning gas to the filters 72. In particular, such a combination allows use of a relatively low number of valves even in relatively large gas filters 20 that may include a large number of individual filters 72. For example, as shown in FIGS. 3 and 4, the combination of five groups of orifices, each with eleven orifices, and eight segments or cleaning positions allows five valves 86 to deliver cleaning gas to fifty-five (55) orifices for the cleaning of four hundred forty (440) filters 72.

Each one of the first, second, third, fourth and fifth valves 136-144 may be configured to selectively deliver cleaning gas from the source of cleaning gas 80 to the orifices fluidly connected to that valve. In some examples, each one of the valves 86 may selectively deliver cleaning gas to the orifices 84 and/or nozzles 108 fluidly connected to that valve without delivering cleaning gas to the orifices 84 and/or nozzles 108 fluidly connected to another one of the valves.

For example, as shown or suggested in FIGS. 3 and 4, the first valve 136 may be configured to selectively deliver cleaning gas from the source of cleaning gas 80 to each of the orifices 84 in the first group of orifices 116 for discharge therethrough. In some examples, the first valve 136 may do so without delivering cleaning gas to the other groups of orifices.

The second valve 138 may be configured to selectively deliver cleaning gas from the source of cleaning gas 80 to each of the orifices 84 in the second group of orifices 118 for discharge therethrough. In some examples, the second valve 138 may do so without delivering cleaning gas to the other groups of orifices. The third valve 140 may be configured to selectively deliver cleaning gas from the source of cleaning gas 80 to each of the orifices in the third group of orifices 120 for discharge therethrough. In some examples, the third valve 140 may do so without delivering cleaning gas to the other groups of orifices. The fourth valve 142 may be configured to selectively deliver cleaning gas from the source of cleaning gas 80 to each of the orifices in the fourth group of orifices 122 for discharge therethrough. In some examples, the fourth valve 142 may do so without delivering cleaning gas to the other groups of orifices. The fifth valve 144 may be configured to selectively deliver cleaning gas from the source of cleaning gas 80 to each of the orifices in the fifth group of orifices 124 for discharge therethrough. In some examples, the fifth valve 144 may do so without delivering cleaning gas to the other groups of orifices.

The valves 86 may be operated or fired remotely. For example, the valves 86 may be remote poppet valves, with the solenoids and other electrical components being housed in a valve control module 146. Thus, as shown in FIGS. 1-4, the each of the valves 86 may be connected to the valve control module 146 via a valve control line 148. The valve control module 146 may include an explosion-proof case disposed within the clean air chamber 34 such that the process gas passing through the gas filter 20 may prevent freezing of the valve controls, with the valves 86 being electrically, mechanically and/or pneumatically activated.

The drive mechanism 90 may be configured to move the cleaning arm 82 relative to the filter plate 24. For example, as shown in the air filter 20 of FIGS. 1-5, the drive mechanism 90 may be configured to move the cleaning arm 82 relative to the filter plate 24 from the first cleaning position 112, shown in FIG. 3, toward the second or other ones of the cleaning positions, as discussed above.

In some examples, the drive mechanism 90 may be configured to move the cleaning arm 82 from a particular one of the cleaning positions toward an adjacent one of the cleaning positions. For example, the drive mechanism 90 may be configured to move the cleaning arm 82 from the first cleaning position 112, as shown in FIG. 3, toward the second cleaning position, from the second cleaning position toward the third cleaning position, from the third cleaning position toward the fourth cleaning position, from the fourth cleaning position toward the fifth cleaning position, from the fifth cleaning position toward the sixth cleaning position, from the sixth cleaning position toward the seventh cleaning position, and from the seventh cleaning position toward the eighth cleaning position. Furthermore, the drive mechanism 90 may be configured to move the cleaning arm 82 from the eighth cleaning position toward the seventh cleaning position, from the seventh cleaning position toward the sixth cleaning position, from the sixth cleaning position toward the fifth cleaning position, from the fifth cleaning position toward the fourth cleaning position, from the fourth cleaning position toward the third cleaning position, from the third cleaning position toward the second cleaning position, and from the second cleaning position toward the first cleaning position 112 shown in FIG. 3. In some examples, the drive mechanism 90 may be configured to move the cleaning arm 82 from a first one of the cleaning positions toward a second one of the cleaning positions that is not adjacent to the first one of the cleaning positions.

As suggested in FIGS. 1-5, the drive mechanism 90 may be configured to rotate the cleaning arm 82 from the first cleaning position 112, as shown in FIG. 3, toward the second or other ones of the cleaning positions. As shown in FIG. 2, the drive mechanism 90 may include a motor 152, a gearbox 154, and a transmission mechanism, such as a chain 156 and sprockets 158, that is configured to induce a rotary motion in the support shaft 160.

As shown in the example presented in FIGS. 1-5, the drive mechanism 90 may be configured to rotate the cleaning arm 82 through less than a complete revolution, such as in an oscillating fashion. For example, the drive mechanism 90 may be configured to rotate the cleaning arm 82 in a first rotational direction through less than 360 degrees of angle from a first one of the cleaning positions, such as the first cleaning position 112, toward a second one of the cleaning positions. The drive mechanism 90 may be configured to subsequently and/or alternatively rotate the cleaning arm 82 in a second rotational direction opposite the first rotational direction through less than 360 degrees of angle from the second one of the cleaning positions toward another one of the cleaning positions such as the first cleaning position 112.

Figure 6:
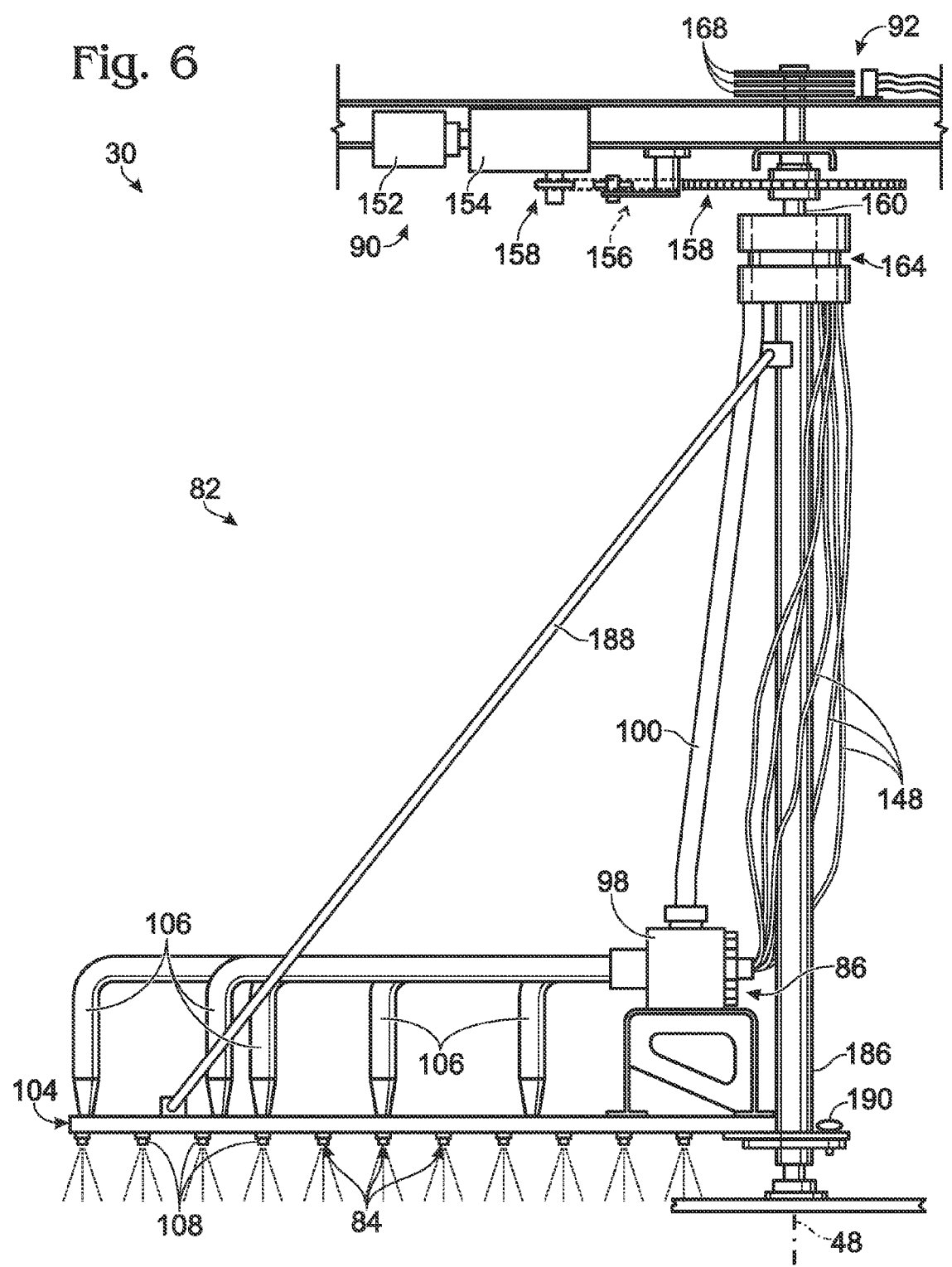
FIG. 6 is a side elevation view of another illustrative example of a cleaning apparatus suitable for use with the gas filter shown in FIG. 1.

As shown in the example presented in FIG. 6, the drive mechanism 90 and the cleaning apparatus 30 may be configured to rotate the cleaning arm 82 through more than a complete revolution in a particular rotational direction. Thus, the drive mechanism 90 and the cleaning apparatus 30 may be configured to rotate the cleaning arm 82 in a particular rotational direction through more than 360 degrees of angle from a first one of the cleaning positions, such as the first cleaning position 112, toward a second one of the cleaning positions or even toward the first cleaning position 112. In such an example, the cleaning apparatus 30 may include slip rings and/or rotary unions 164 for the hose 100 and/or the valve control lines 148, as schematically shown in FIG. 6.

Figure 5:
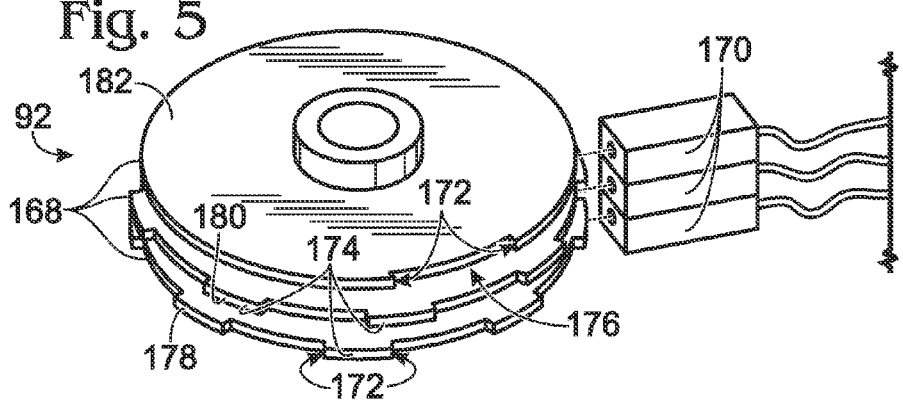
FIG. 5 is a perspective view of a timing system suitable for use with the cleaning apparatus shown in FIGS. 1-4.

The sensor 92 may be configured to provide a signal or indication when the cleaning arm 82 is proximate and/or in one of the cleaning positions. As shown in FIG. 5, the sensor 92 may include a plurality of sensing wheels 168 along with corresponding sensing devices 170. The sensing devices 170 may be configured to detect a particular indicia or feature on the sensing wheels 168, such as an edge 172 of one of the tabs 174 or the notch 176 on an associated one of the sensing wheels 168. A first one of the sensing wheels 178 may be configured for providing indications when the cleaning arm 82 is rotating in a first rotational direction. A second one of the sensing wheels 180 may be configured for providing indications when the cleaning arm 82 is rotating in a second rotational direction opposite to the first rotational direction. The number of tabs 174 on the first and second ones of the sensing wheels may correspond to the number of segments 50 of the filter plate 24 and/or the number of cleaning positions. A third one of the sensing wheels 182 may be configured for providing indications when the cleaning arm 82 is proximate a home or limit position, such as the first cleaning position 112, which may provide an indication that the drive mechanism should reverse the direction of rotation of the cleaning arm 82. It should be understood that the widths and/or relative widths of tabs 174 and notches 176, including the offsets of tabs and notches amongst the various ones of the sensing wheels 168 shown in FIG. 5 are illustrative only, with other combinations of widths, relative widths, and/or offsets being possible.

In some examples, the sensor 92 may be configured to provide indications that are indicative of the cleaning arm being proximate a particular one of the cleaning positions. For example, the sensor 92 may provide a first indication when the support is proximate a first one of cleaning positions, a second indication when the support is proximate a second one of cleaning positions, and a third indication when the support is proximate a third one of the cleaning positions, etc. In some examples, the sensor 92 may be configured to provide an indication that is consistent or the same, regardless of the particular cleaning position to which the cleaning arm is proximate. Thus, in such an example, the first, second, third, and any other indications may be the same.

The sensing devices 170 may be any device that may be configured to detect a particular indicia or feature on the sensing wheels 168. For example, the sensing devices may be configured to detect the presence or absence of a nearby metal object, which may be indicative of an edge 172 of a tab 174 or notch 176 on a sensing wheel 168. Other nonexclusive illustrative examples of mechanisms or methods by which the sensor 92 and/or the sensing devices 170 may function may include timing devices, encoders, such as optical encoders, angle position sensors, photo sensors, limit switches, or the like. A timing device may include a pneumatic logic circuit and mechanical inputs from pneumatic valves, cam roller valves, limit switches, or the like.

When configured for rotation about the axis 48, the cleaning arm 82 may include a support tube 186 that is rotationally disposed about the support shaft 160. The blow tube assembly 104 may be at least partially supported relative to the support tube 186 via at least one support rod 188. The plenum 98 may be disposed on the blow tube assembly 104, such as proximate the support tube 186, as shown in FIGS. 2-4. The support tube 186 and cleaning arm 82 may be rotationally secured to the support shaft 160 via a shear pin 190. The shear pin 190 may be configured to shear or break off if the cleaning arm 82 impacts an obstacle during rotation. Furthermore, removal of the shear pin 190 may permit manual rotation of the cleaning arm 82, which may assist with replacement of at least some of the filters 72 and/or with other maintenance to the gas filter 20 or cleaning apparatus 30.

The control system 88 may be any mechanism, device, or system that may be configured to control the cleaning apparatus 30, such as by controlling the drive mechanism 90 and/or the operation of the valves 86. A suitable control system 88 may be electrical, mechanical, pneumatic, electromechanical or any other suitable type. Electrical examples of control system 88 may be based at least partially on analog and/or digital technology. For example, the control system 88 may include a microprocessor and/or other specialized or general purpose circuitry.

The control system 88 may be configured to cause the drive mechanism 90 to move and/or rotate the cleaning arm 82 at a first speed when the cleaning arm 82 is proximate one of the cleaning positions. The control system 88 may be configured to cause the drive mechanism 90 to move and/or rotate the cleaning arm 82 at a second speed higher than the first speed when the cleaning arm 82 is spaced from a cleaning position. For example, the control system 88 may be configured to cause the drive mechanism 90 to move and/or rotate the cleaning arm 82 at approximately 150% of a base speed when the cleaning arm 82 is spaced from a cleaning position and at approximately 50% of the base speed when the cleaning arm 82 is proximate one of the cleaning positions. Thus, in some examples where the drive mechanism 90 rotates the cleaning arm 82 as shown in FIGS. 1-5, the base speed may be about 1 RPM with the first speed being about 0.5 RPM and the second speed being about 1.5 RPM. It should be understood that these particular speeds and ratios between the first and second speeds are merely examples and that other speeds, both faster and slower, and other ratios between the first and second speeds, both higher and lower, are within the scope of the present disclosure. Suitable speeds and/or base speeds may be a function of the size of a particular gas filter 20. In some examples, although the speed or rotational rate of the cleaning arm 82 may vary or be controlled as described above, the control system 88 may be configured to cause the drive mechanism 90 to continuously rotate the cleaning arm 82.

The control system 88 may be configured to cause the drive mechanism 90 to set and/or adjust the speed of movement and/or rotation of the cleaning arm 82 in response to signals or indications received from the sensor 92. For example, in response to an indication from the sensor 92 that corresponds to detection of a first approached or leading one of the edges 172 of one of the tabs 174 on a particular one of the sensing wheels 178 or 180, the control system 88 may cause the drive mechanism 90 to ramp the speed of the cleaning arm 82 from the second speed to the first speed. In response to an indication from the sensor 92 that corresponds to detection of a second approached or trailing one of the edges 172 of one of the tabs 174 on the particular one of the sensing wheels 178 or 180 and/or within a predetermined time after that indication, the control system 88 may cause the drive mechanism 90 to ramp the speed of the cleaning arm 82 from the first speed to the second speed. In some examples, in response to an indication from the sensor 92 that corresponds to detection of a first approached or leading one of the edges 172 of the notch 176 in the sensing wheel 182, the control system 88 may cause the drive mechanism 90 to ramp the speed of the cleaning arm 82 to zero, reverse the direction of the cleaning arm 82, and ramp the speed of the cleaning arm 82 to the first speed.

The control system 88 may be configured to activate one of the valves 86 to cause a discharge of cleaning gas from the orifices 84 in the group of orifices associated with that valve when the cleaning arm 82 is proximate or in a cleaning position. For example, the control system 88 may be configured to activate the first valve 136 to cause a discharge of cleaning gas from the orifices 84 in the first group of orifices 116 toward the filter plate 24 when the cleaning arm 82 is proximate or in a first one of the cleaning positions, such as the first cleaning position 112, as shown in FIG. 3. The control system 88 may be configured to activate the second valve 138 to cause a discharge of cleaning gas from the orifices 84 in the second group of orifices 118 toward the filter plate 24 when the cleaning arm 82 is proximate or in a second one of the cleaning positions. The control system 88 may be configured to activate the third valve 140 to cause a discharge of cleaning gas from the orifices 84 in the third group of orifices 120 toward the filter plate 24 when the cleaning arm 82 is proximate or in a third one of the cleaning positions. The control system 88 may be configured to activate the fourth valve 142 to cause a discharge of cleaning gas from the orifices 84 in the fourth group of orifices 122 toward the filter plate 24 when the cleaning arm 82 is proximate or in a fourth one of the cleaning positions. The control system 88 may be configured to activate the fifth valve 144 to cause a discharge of cleaning gas from the orifices 84 in the fifth group of orifices 124 toward the filter plate 24 when the cleaning arm 82 is proximate or in a fifth one of the cleaning positions.

The control system 88 may be configured to activate particular ones of the valves 86 in a predetermined sequence or order as the cleaning arm 82 moves amongst the plurality of cleaning positions. For example, with reference to the cleaning apparatus 30 shown in FIG. 1-5, the control system 88 may be configured to sequentially activate the first, second, third, fourth, and fifth valves 136-144 as the cleaning arm 82 is sequentially in or proximate the first cleaning position, the second cleaning position, the third cleaning position, the fourth cleaning position, the fifth cleaning position, the sixth cleaning position, the seventh cleaning position, and the eighth cleaning position. In such an example, the first valve 136 would initially be activated when the cleaning arm 82 is in or proximate the first cleaning position 112, the second valve 138 would be activated when the cleaning arm 82 is in or proximate the second cleaning position, the third valve 140 would be activated when the cleaning arm 82 is in or proximate the third cleaning position, the fourth valve 142 would be activated when the cleaning arm 82 is in or proximate the fourth cleaning position, and the fifth valve 144 would be activated when the cleaning arm 82 is in or proximate the fifth cleaning position. When the cleaning arm 82 is in or proximate the sixth cleaning position, the first valve 136 may again be activated, followed by the second valve 138 when the cleaning arm 82 is in or proximate the seventh cleaning position, and the third valve 140 when the cleaning arm 82 is in or proximate the eighth cleaning position.

Where the cleaning arm 82 is configured for oscillating motion or rotation, the control system 88 may cause the cleaning arm 82 to pause in or proximate the eighth cleaning position and then activate the fourth valve 142, followed by the fifth valve 144 when the cleaning arm 82 is in or proximate the seventh cleaning position. In such an example, the control system 88 may cause the cleaning arm 82 to pause in or proximate the first cleaning position after activating a first one of the valves 86 and then subsequently activating a second one of the valves 86 prior to causing the cleaning arm 82 to move toward the second cleaning position. Thus, in such an example, the control system 88 may consecutively activate the first through fifth valves 136-144 followed by further cycles of consecutive activation of the first through fifth valves 136-144 as the cleaning arm 82 moves through the cleaning positions from the first cleaning position toward the eight cleaning position and back toward the first cleaning position. Further, two consecutive ones of the first through fifth valves 136-144 may be activated when the cleaning arm 82 is in or proximate each of the first and eighth cleaning positions. When the cleaning arm 82 is configured for rotation through more than a complete revolution in a particular rotational direction, the control system 88 may consecutively activate the first through fifth valves 136-144 followed by further cycles of consecutive activation of the first through fifth valves 136-144 as the cleaning arm 82 repeatedly moves through the cleaning positions from the first cleaning position toward the eighth cleaning position.

The particular sequences of activation discussed herein may be selected to clean successive groups of orifices that may be spaced from one another or that may only share a single common corner. Such a configuration may provide a more even pressure distribution across the filter plate 24 as the cleaned and un-cleaned filters 72 may be relatively evenly spatially distributed across the filter plate. In addition, such a configuration may reduce re-ingestion of the cake discharged from currently cleaned ones of the filters 72 into nearby recently cleaned ones of the filters 72, through which there may be a relatively higher flow of process gas.

The control system 88 may be configured to activate particular ones of the valves 86 in response to signals or indications received from the sensor 92. For example, in response to an indication from the sensor 92 that corresponds to detection of one of the edges 172, such as a second approached or trailing one of the edges 172, of one of the tabs 174 on one of the sensing wheels 178, 180, the control system 88 may activate one of the valves 86. The timing of the indication from the sensor 92 may be configured to provide a valve activation that results in a discharge of cleaning gas that may begin and/or end while the particular orifices associated with that valve are configured and/or aligned for discharge of cleaning gas toward corresponding ones of the openings 70. Activating the valves 86 in response to signals or indications received from the sensor 92 may permit improved cleaning of the filters 72 and/or improve the efficiency of the gas filter 20 and/or the cleaning apparatus 30. For example, causing activation of the valves 86 in response to signals or indications received from the sensor 92 may reduce or prevent the discharge of cleaning gas when the cleaning arm is not in a cleaning position with the orifices 84 configured and/or aligned for discharge of cleaning gas toward corresponding ones of the openings 70.

The control system 88 may be configured to activate at least some of the valves 86 when the cleaning arm 82 is moving or rotating. For example, control system 88 may be configured activate particular ones of the valves 86 while the cleaning arm 82 is proximate a cleaning position and moving at the first speed. As discussed above, the control system 88 may cause the drive mechanism 90 to ramp down the speed of the cleaning arm 82 in response to an indication from the sensor 92 that corresponds to detection of a first approached or leading one of the edges 172. In response to an indication from the sensor 92 that corresponds to detection of a second approached or trailing one of the edges 172 of one of the tabs 174, the control system 88 may activate one of the valves 86 for a predetermined period of time, such as about 400 ms. When the control system 88 has deactivated the valve, the control system 88 may then ramp up the speed of the cleaning arm 82. A suitable value for the speed of the cleaning arm 82 during valve activation may be determined based on a desired valve activation or pulse time. In particular, the speed of the cleaning arm 82 during valve activation may be low enough that the orifices 84 from which cleaning gas is being discharged remain configured and/or aligned for discharge of cleaning gas toward corresponding ones of the openings 70 during the entire valve activation or pulse time.

In the case of a rotating cleaning arm 82, as shown in FIGS. 1-5, the angular velocity of the cleaning arm 82 during valve activation and/or the activation period of the valves 86 may be set based on the relative speeds between the orifices located furthest from the axis 48 and the corresponding ones of the openings 70. In particular, for a given angular velocity or rate of rotation, the tangential velocity of the orifices 84 may be highest for the orifices 84 located furthest from the axis 48, such as the orifices in the fifth group of orifices 124. Thus, in some examples, the angular velocity of the cleaning arm 82 during valve activation and/or the activation period of the valves 86 may be set such that the orifices 84 located furthest from the axis 48 remain configured and/or aligned for discharge of cleaning gas toward corresponding ones of the openings 70 during the entire valve activation or pulse time.

In some examples, the control system 88 may be configured to activate at least some of the valves 86 when the cleaning arm 82 is not moving. For example, the control system 88 may pause the cleaning arm 82 in each successive cleaning position prior to activating one of the valves 86.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A cleaning apparatus for an air filter that has clean and dirty air chambers separated by a partition having a plurality of openings each provided with a filter bag extending into the dirty air chamber, wherein the partition is divided into a plurality of segments with an equal number of the openings disposed in approximately the same arrangement in each segment, the cleaning apparatus comprising:

a source of cleaning gas;

a support disposed within the clean air chamber;

a number of orifices disposed on the support and arranged in approximately the same arrangement as the arrangement of openings in each segment, wherein:

the number of orifices corresponds to the number of the openings disposed in each segment, the orifices are divided into at least first, second and third groups of orifices, each of the first group of orifices is fluidly connected to a first valve, each of the second group of orifices is fluidly connected to a second valve, and each of the third group of orifices is fluidly connected to a third valve, at least one division that fluidly divides each one of the first, second, and third groups of orifices from the other groups of orifices, each one of the first, second and third valves is configured to selectively deliver cleaning gas from the source of cleaning gas to the orifices fluidly connected to that valve without delivering cleaning gas to the orifices fluidly connected to another one of the first, second and third valves, and each of the orifices is configured to discharge cleaning gas toward the partition;

a drive mechanism configured to move the support relative to the partition from a first cleaning position toward a second cleaning position and a third cleaning position, where in the first cleaning position the support positions the orifices proximate the openings disposed in a first one of the segments, in the second cleaning position the support positions the orifices proximate the openings disposed in a second one of the segments, and in the third cleaning position the support positions the orifices proximate the openings disposed in a third one of the segments;

a sensor configured to provide: a first indication when the support is proximate a first one of the first, second and third cleaning positions, a second indication when the support is proximate a second one of the first, second and third cleaning positions, and a third indication when the support is proximate a third one of the first, second and third cleaning positions; and a control system, wherein responsive to the first indication the control system is configured to activate the first valve to discharge cleaning gas from the first group of orifices, responsive to the second indication the control system is configured to activate the second valve to discharge cleaning gas from the second group of orifices, and responsive to the third indication the control system is configured to activate the third valve to discharge cleaning gas from the third group of orifices.

2. The cleaning apparatus of claim 1, wherein each segment corresponds approximately to a circular sector, the support is configured to rotate about an axis that is perpendicular to the partition, and the drive mechanism is configured to rotate the support from the first cleaning position toward the second cleaning position and from the second cleaning position toward the third cleaning position.

3. The cleaning apparatus of claim 2, wherein at least some of the orifices in the second group of orifices are disposed further from the axis than at least some of the orifices in the first group of orifices, and at least some of the orifices in the third group of orifices are disposed further from the axis than at least some of the orifices in the second group of orifices.

4. The cleaning apparatus of claim 3, wherein the plurality of segments includes a first number of segments, the orifices are divided into a second number of groups of orifices, and the first number is greater than the second number.

5. The cleaning apparatus of claim 4, wherein the drive mechanism is configured to rotate the support in a first rotational direction through less than 360 degrees of angle from the first one of the first, second and third cleaning positions toward the second one of the first, second and third cleaning positions, and the drive mechanism is configured to subsequently rotate the support in a second rotational direction opposite to the first rotational direction through less than 360 degrees of angle from the second one of the first, second and third cleaning positions toward the third one of the first, second and third cleaning positions.

6. The cleaning apparatus of claim 2, wherein the first, second and third indications are the same.

7. The cleaning apparatus of claim 2, wherein the drive mechanism is configured to rotate the support at a first speed when the support is proximate one of the first, second and third cleaning positions, and at a second speed higher than the first speed when the support is spaced from the first, second and third cleaning positions.

8. The cleaning apparatus of claim 7, wherein the control system is configured to activate the first, second and third valves while the drive mechanism is moving the support at the first speed.

9. An air filter, comprising:
a housing having a dirty air portion and a clean air portion proximate the dirty air portion;
an inlet fluidly connected with the dirty air portion;
an outlet fluidly connected with the clean air portion;
a filter plate disposed between and separating the dirty air portion from the clean air portion and including a plurality of openings, wherein the filter plate is divided into a first number of segments with a second number of the openings disposed in a first pattern in each of the segments;
a filter bag disposed in each of the openings;
a cleaning arm disposed within the clean air portion and configured for rotation about an axis that is perpendicular to the filter plate;
a drive mechanism configured to rotate the cleaning arm from a first cleaning position toward a second cleaning position;
a sensor configured to provide a first indication when the cleaning arm is proximate the first cleaning position and a second indication when the cleaning arm is proximate the second cleaning position;
a source of cleaning gas;
a third number of nozzles disposed on the cleaning arm, wherein:
the nozzles are arranged in a second pattern approximately corresponding to the first pattern and the third number corresponds to the second number,
each of the nozzles is configured for selective discharge of cleaning gas toward a corresponding one of the openings in a first one of the segments when the cleaning arm is proximate the first cleaning position,
each of the nozzles is configured for selective discharge of cleaning gas toward a corresponding one of the openings in a second one of the segments when the cleaning arm is proximate the second cleaning position,
the nozzles are grouped into a fourth number of groups of nozzles with the first number of segments being greater than the fourth number of groups of nozzles,
each of the nozzles in a first one of the groups of nozzles is fluidly connected to a first valve and each of the nozzles in a second one of the groups of nozzles is fluidly connected to a second valve, the first valve is configured to selectively deliver cleaning gas from the source of cleaning gas to each of the nozzles in the first one of the groups of nozzles for discharge, and the second valve is configured to selectively deliver cleaning gas from the source of cleaning gas to each of the nozzles in the second group of nozzles for discharge without delivering cleaning gas to the nozzles in the first one of the groups of nozzles, and
at least some of the nozzles in the second one of the groups of nozzles are disposed further from the axis than at least some of the nozzles in the first one of the groups of nozzles; and
a control system configured to activate the first valve to cause a discharge of cleaning gas from the nozzles of the first one of the groups of nozzles toward the filter plate in response to the first indication and to activate the second valve to cause a discharge of cleaning gas from the nozzles of the second one of the groups of nozzles toward the filter plate in response to the second indication, the air filter being free from a venturi nozzle.

10. The air filter of claim 9, wherein the drive mechanism is configured to rotate the cleaning arm at a first speed when the cleaning arm is proximate the first cleaning position, at a second speed higher than the first speed when the cleaning arm is spaced from the first and second cleaning positions, and at the first speed when the cleaning arm is proximate the second cleaning position.

11. The air filter of claim 10, wherein the control system is configured to activate the first valve while the drive mechanism is moving the cleaning arm at the first speed, and the control system is configured to activate the second valve while the drive mechanism is moving the cleaning arm at the first speed.

12. The air filter of claim 9, wherein the drive mechanism is configured to rotate the cleaning arm in a first rotational direction through less than 360 degrees of angle from the first cleaning position toward the second cleaning position and in a second rotational direction opposite the first rotational direction through less than 360 degrees of angle from the second cleaning position toward the first cleaning position.

13. The air filter of claim 9, wherein the dirty air portion comprises a filter portion, a cylindrical inlet portion, and at least one vortex breaker disposed between the filter portion and the cylindrical inlet portion, the inlet is configured to induce a cyclonic flow of dirty air within the cylindrical inlet portion, and the at least one vortex breaker is configured to at least partially transform the cyclonic flow of dirty air into a flow of dirty air that is aligned with the axis.

14. The air filter of claim 9, wherein there are at least eight segments and at least five groups of nozzles, and each segment corresponds approximately to a circular sector.

15. The cleaning apparatus of claim 1, wherein at least one of the first, second and third groups of orifices includes at least two orifices.

\* \* \* \* \*